(12) United States Patent
Adefris (10) Patent No.: US 8,728,185 B2
(45) Date of Patent: May 20, 2014

(54) INTERSECTING PLATE SHAPED ABRASIVE PARTICLES

(75) Inventor: Negus B. Adefris, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/811,028

(22) PCT Filed: Aug. 3, 2011

(86) PCT No.: PCT/US2011/046408
§ 371 (c)(1),
(2), (4) Date: Jan. 18, 2013

(87) PCT Pub. No.: WO2012/018903
PCT Pub. Date: Feb. 9, 2012

(65) Prior Publication Data
US 2013/0125477 A1 May 23, 2013

Related U.S. Application Data

(60) Provisional application No. 61/370,497, filed on Aug. 4, 2010.

(51) Int. Cl.
*B24D 3/00* (2006.01)
*B24D 11/00* (2006.01)
*B24D 18/00* (2006.01)
*C09K 3/14* (2006.01)
*B24D 3/02* (2006.01)
*C09C 1/68* (2006.01)

(52) U.S. Cl.
USPC .............. 51/309; 51/307; 51/308; 51/293

(58) Field of Classification Search
USPC .................... 51/309, 293, 307, 308
See application file for complete search history.

(56) References Cited

U.S. PATENT DOCUMENTS

| | | |
|---|---|---|
| 1,910,444 A | 5/1933 | Nicholson |
| 3,041,156 A | 6/1962 | Roswe |
| 4,314,827 A | 2/1982 | Leitheiser |
| 4,744,802 A | 5/1988 | Schwabel |
| 4,799,939 A | 1/1989 | Bloecher |
| 4,997,461 A | 3/1991 | Markhoff-Matheny |
| 5,009,675 A | 4/1991 | Kunz |
| 5,011,508 A | 4/1991 | Wald |
| 5,042,991 A | 8/1991 | Kunz |
| 5,078,753 A | 1/1992 | Broberg |
| 5,085,671 A | 2/1992 | Martin |
| 5,152,917 A | 10/1992 | Pieper |
| 5,201,916 A | 4/1993 | Berg |
| 5,213,591 A | 5/1993 | Celikkaya |
| 5,352,254 A | 10/1994 | Celikkaya |
| 5,366,523 A | 11/1994 | Rowenhorst |
| 5,435,816 A | 7/1995 | Spurgeon |
| 5,441,549 A | 8/1995 | Helmin |
| 5,551,963 A | 9/1996 | Larmie |
| RE35,570 E | 7/1997 | Rowenhorst |
| 5,645,619 A | 7/1997 | Erickson |
| 5,672,097 A * | 9/1997 | Hoopman ............... 451/526 |
| 5,946,991 A | 9/1999 | Hoopman |
| 5,975,987 A | 11/1999 | Hoopman |
| 5,984,988 A | 11/1999 | Berg |

(Continued)

*Primary Examiner* — James McDonough
(74) *Attorney, Agent, or Firm* — Scott A. Baum (57) ABSTRACT

Shaped abrasive particles comprising a ceramic and comprising a first plate integrally joined to a second plate at a predetermined angle β.

14 Claims, 5 Drawing Sheets

(56) References Cited

U.S. PATENT DOCUMENTS

| | | | |
|---|---|---|---|
| 6,019,805 A * | 2/2000 | Herron | 51/295 |
| 6,129,540 A | 10/2000 | Hoopman | |
| 6,214,068 B1 * | 4/2001 | Ferronato | 51/297 |
| 6,277,161 B1 * | 8/2001 | Castro et al. | 51/309 |
| 2009/0165394 A1 * | 7/2009 | Culler et al. | 51/296 |
| 2009/0169816 A1 | 7/2009 | Erickson | |
| 2010/0146867 A1 | 6/2010 | Boden | |
| 2010/0151195 A1 | 6/2010 | Culler | |
| 2010/0151196 A1 | 6/2010 | Adefris | |
| 2010/0151201 A1 | 6/2010 | Erickson | |
| 2012/0227333 A1 | 9/2012 | Adefris | |

* cited by examiner

INTERSECTING PLATE SHAPED ABRASIVE PARTICLES

CROSS REFERENCE TO RELATED APPLICATIONS

This application is a national stage filing under 35 U.S.C. 371 of PCT/US2011/046408, filed Aug. 3, 2011, which claims priority to U.S. Provisional Patent Application No 61/370,497, filed Aug. 4, 2010, the disclosures of which are incorporated by reference in their entirety herein.

BACKGROUND

Abrasive particles and abrasive articles made from the abrasive particles are useful for abrading, finishing, or grinding a wide variety of materials and surfaces in the manufacturing of goods. As such, there continues to be a need for improving the cost, performance, or life of the abrasive particle and/or the abrasive article.

Triangular shaped abrasive particles and abrasive articles using the triangular shaped abrasive particles are disclosed in U.S. Pat. No. 5,201,916 to Berg; U.S. Pat. No. 5,366,523 to Rowenhorst (Re 35,570); and U.S. Pat. No. 5,984,988 to Berg. In one embodiment, the abrasive particles' shape comprised an equilateral triangle. Triangular shaped abrasive particles are useful in manufacturing abrasive articles having enhanced cut rates.

SUMMARY

Shaped abrasive particles, in general, can have superior performance over randomly crushed abrasive particles. By controlling the shape of the abrasive particle, it is possible to control the resulting performance of the abrasive article. The inventors have discovered that by making shaped abrasive particles comprising a first plate and a second plate intersecting at a predetermined angle, the rake angle of one of the plates relative to the workpiece can be precisely controlled in a coated abrasive article since one plate can act as a base to anchor the shaped abrasive particle to the backing while the other plate contacts the workpiece at the predetermined rake angle.

Other advantages can include: 1. Using the size of the bottom plate adhered to the make coat to control the spacing and density of the abrasive points contacting the workpiece. This technique can control the abrasive layer's degree of openness, which can be adjusted for abrading different materials. 2. Formation of channels for swarf removal. Since the abrasive points can be controllable spaced by the size and shape of the base, channels in the abrasive layer can be formed for conducting cooling fluid or for swarf removal. 3. Creating shaped abrasive particles having more points and less flat surfaces. The triangular shaped abrasive particles of RE 35,570 have two opposing flat surfaces and three vertices which could contact the workpiece. The intersecting plate shaped abrasive particles of FIG. 3 have only one flat surface and 5 vertices that could contact the workpiece significantly increasing the chances that a vertex will contact the workpiece instead of a flat surface. This can be a particular advantage in a nonwoven construction were controlling the shaped abrasive particle's orientation is more difficult than in a coated abrasive article. 4. Less bearing area and propensity to form a large wear flat in some embodiments. If the shaped abrasive particle was a tetrahedron, as a vertex wears, the bearing area increases rapidly. The intersecting plate shaped abrasive particle of FIG. 1 has the same base as a tetrahedron, but significantly less increase in the bearing area as the upper vertex is worn down. 5. Better retention in nonwoven structures. The intersection of the two plates is believed to result in better adhesion of the plate shaped abrasive particles to the nonwoven fibers and prevent the particles from falling through or more deeply into the nonwoven web.

Hence, in one embodiment, the invention resides in shaped abrasive particles comprising a ceramic and comprising a first plate integrally joined to a second plate at a predetermined angle β.

BRIEF DESCRIPTION OF THE DRAWINGS

It is to be understood by one of ordinary skill in the art that the present discussion is a description of exemplary embodiments only, and is not intended as limiting the broader aspects of the present disclosure, which broader aspects are embodied in the exemplary construction.

Repeated use of reference characters in the specification and drawings is intended to represent the same or analogous features or elements of the disclosure.

DEFINITIONS

As used herein, forms of the words "comprise", "have", and "include" are legally equivalent and open-ended. Therefore, additional non-recited elements, functions, steps or limitations may be present in addition to the recited elements, functions, steps, or limitations.

As used herein, the term "abrasive dispersion" means an alpha alumina precursor that can be converted into alpha alumina that is introduced into a mold cavity. The composition is referred to as an abrasive dispersion until sufficient volatile components are removed to bring solidification of the abrasive dispersion.

As used herein, the term "integrally joined" means the same material forming the first and second plate joins the two plates. A separate binder having a different chemical composition is not used to attach the two plates.

As used herein, the term "precursor shaped abrasive particle" means the unsintered particle produced by removing a sufficient amount of the volatile component from the abrasive dispersion, when it is in the mold cavity, to form a solidified body that can be removed from the mold cavity and substantially retain its molded shape in subsequent processing operations.

As used herein, the term "shaped abrasive particle", means a ceramic abrasive particle with at least a portion of the abrasive particle having a predetermined shape that is replicated from a mold cavity used to form the precursor shaped abrasive particle. Except in the case of abrasive shards (e.g. as described in U.S. provisional application 61/016,965), the shaped abrasive particle will generally have a predetermined geometric shape that substantially replicates the mold cavity that was used to form the shaped abrasive particle. Shaped abrasive particle as used herein excludes abrasive particles obtained by a mechanical crushing operation.

DETAILED DESCRIPTION

Intersecting Plate Shaped Abrasive Particles

Referring to FIGS. 1-4 exemplary intersecting plate shaped abrasive particles 20 are illustrated. In one embodiment, the material from which the shaped abrasive particle 20 is made comprises alpha alumina. Alpha alumina particles can be made from a dispersion of aluminum oxide hydroxide or aluminum monohydrate that is gelled, molded to shape, dried to retain the shape, calcined, and then sintered as discussed herein later. The intersecting plate shaped abrasive particle's geometry is retained without the need for a binder to form an agglomerate comprising abrasive particles held together by a binder.

In general, the shaped abrasive particles 20 comprise at least two intersecting plates having a first plate 21 integrally joined (in one embodiment when the shaped abrasive particle is molded) to a second plate 23 at a predetermined angle $\beta$ measured between the center plane (dashed line) of each plate. Each plate comprises a first major surface and a second major surface opposing the first major surface. One or both of the plates can be tapered, plano-concave (one planar surface with one concave surface), plano-convex (one planar surface with one convex surface), both surfaces convex, both surfaces concave, curved with parallel or tapering surfaces, or have two substantially planar and parallel surfaces. In some embodiments, the major surfaces are joined by a sidewall forming plates with a thickness along the perimeter and in other embodiments the first and/or second major surface(s) can taper forming a thin edge or line where they are joined such as the intersection between two convex surfaces. The plates can abruptly intersect forming a distinct line, or a radius can be utilized at the intersection forming a more gradual transition between the plates. In other embodiments, three, four, five or more plates can intersect to form the shaped abrasive particle.

Figure 5:
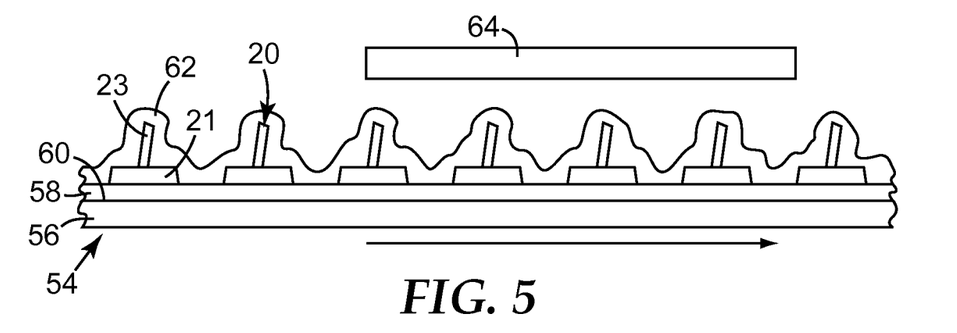
FIG. 5 illustrates a coated abrasive article containing the intersecting plate shaped abrasive particles comprising a first plate and a second plate.

In some embodiments, the first plate 21 acts as a base to secure the shaped abrasive particle to a backing 56 in a coated abrasive article 54 while the second plate 23 acts as the grinding member to abrade a workpiece 64 as best seen in FIG. 5. Because the first plate and the second plate intersect at a predetermined angle $\beta$, the rake angle of the second plate 23 relative to the workpiece can be precisely controlled thereby either improving the cut rate, the finish, or both of the coated abrasive article. The large, flat first plate acting as a base also helps to more securely hold the shaped abrasive particles to the backing as compared to just using an edge of one of the plates.

Figure 1A:
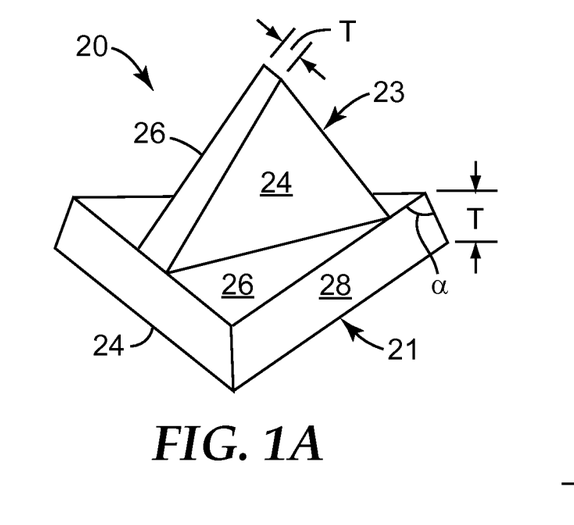
FIGS. 1A and 1B illustrate one embodiment of the intersecting plate shaped abrasive particles comprising a first plate and a second plate.
Figure 1B:
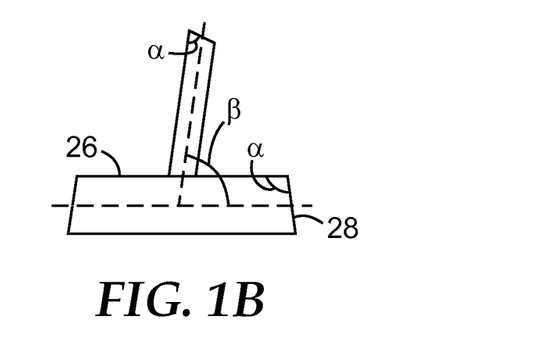

The first and second plates (21, 23) can comprise thin bodies having a first major surface 24, and a second major surface 26 and having a thickness T. In some embodiments, the thickness T ranges between about 5 micrometers to about 1 millimeter. The plates can comprise a uniform thickness or the thickness of the plates can taper or vary. In some embodiments, the first major surface 24 and the second major surface 26 are connected to each other by at least one sidewall 28, which may be a sloping sidewall as shown in FIG. 1 having a draft angle $\alpha$ between the second major surface 26 and the sidewall 28 other than 90 degrees. In some embodiments, more than one sloping sidewall 28 can be present and the slope or angle for each sloping sidewall 28 may be the same or different as more fully described in pending U.S. patent application Ser. No. 12/337,075 filed on Dec. 17, 2008 entitled "Shaped Abrasive Particles With A Sloping Sidewall." In other embodiments, the sidewall 28 can intersect the first major surface 24 and the second major surface 26 at a 90 degree angle.

In one embodiment, the first and second major surfaces (24, 26) of the first and second plates (21, 23) comprise a selected geometric shape such as a circle, an oval, a triangle, a quadrilateral (rectangle, square, trapezoid, rhombus, rhomboid, kite, superellipse), or other multi-edged geometric shape (pentagon, hexagon, octagon, etc). Alternatively, the first and second major surfaces (24, 26) can comprise an irregular, repeatable shape (replicated by the mold cavity) or a shape combining line segments and arcuate segments to form the outline or perimeter. Depending on the draft angle $\alpha$, the areas of the first and second major surfaces of each plate can be the same or different. In many embodiments, the first plate and the second plate comprise a prism (90 degree draft angle) or a truncated pyramid (draft angle not equal to 90 degrees) such as a triangular prism, a truncated triangular pyramid, a rhombus prism, or a truncated rhombus pyramid to name a few possibilities.

In one embodiment, shown in FIG. 1 the first plate 21 comprised a truncated triangular pyramid and the second plate 23 comprised a truncated triangular pyramid intersecting with the first plate at a predetermined angle $\beta$. In other embodiments, both plates can be prisms or one plate can be a prism while the other plate is a truncated pyramid. In one embodiment, the major surfaces of each plate comprised equilateral triangles with the second plate having a slightly smaller size such that its edge fits within the second major surface 26 of the first plate 21 as shown in FIG. 1. The second plate 23 can be located on the second major surface 26 of the first plate 21 with one of its edges (sidewall) being bisected by an imaginary line on the second major surface 26 of the first plate 21 that intersects with the perimeter of the second major surface at a 90 degree angle and that bisects one of the second major surface's vertexes. In one specific embodiment, the predetermined angle $\beta$ was 82 degrees and the draft angle $\alpha$ for each plate was 98 degrees.

Figure 2A:
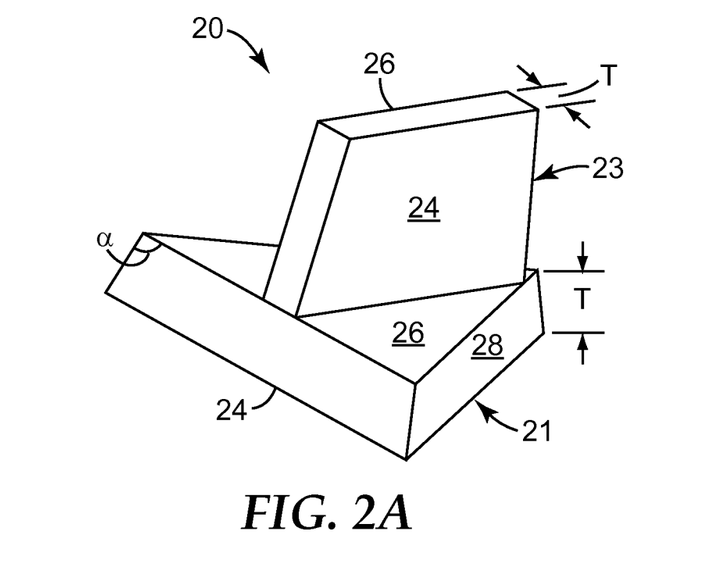
FIGS. 2A and 2B illustrate another embodiment of the intersecting plate shaped abrasive particles comprising a first plate and a second plate.
Figure 2B:
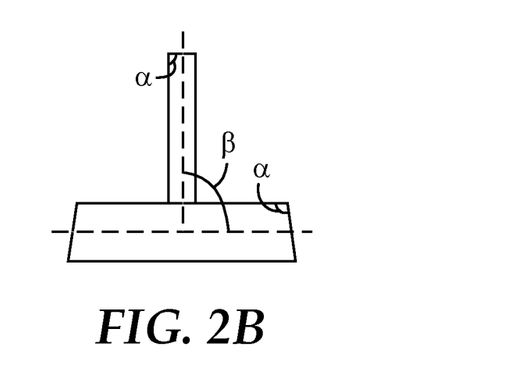

In another embodiment, shown in FIG. 2 the first plate 21 comprised a truncated triangular pyramid (alternatively a prism) and the second plate 23 comprised a rectangular (trapezoid) prism (alternatively a truncated pyramid) intersecting with the first plate at a predetermined angle $\beta$. In other embodiments, both plates can be prisms or both plates can be pyramids. The second plate 23 can be located on the second major surface 26 of the first plate 21 with one of its edges (sidewall) being bisected by an imaginary line on the second major surface 26 of the first plate 21 that intersects with the perimeter of the second major surface at a 90 degree angle and that bisects one of the second major surface's vertexes. In one specific embodiment, the predetermined angle β was 90 degrees and the draft angle α for the first plate was 98 degrees and for the second plate was 90 degrees.

Figure 3A:
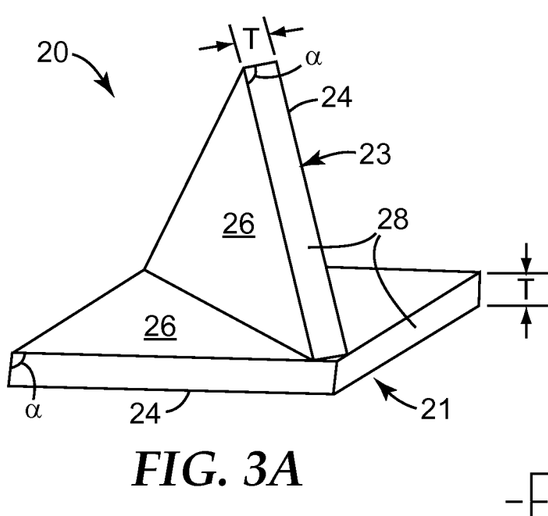
FIGS. 3A and 3B illustrate another embodiment of the intersecting plate shaped abrasive particles comprising a first plate and a second plate.
Figure 3B:
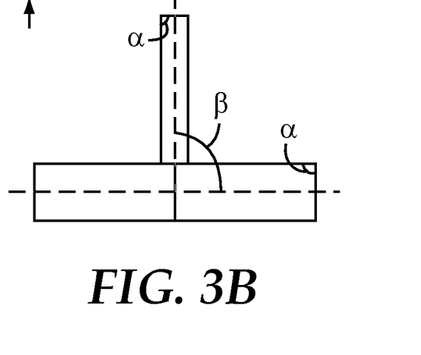

In another embodiment, shown in FIG. 3 the first plate 21 comprised a rhombus (diamond) prism and the second plate 23 comprised a triangular prism. In other embodiments, both plates can be truncated pyramids or one of the plates can be a prism while the other plate is a truncated pyramid. The second plate 23 can be located on the second major surface 26 of the first plate 21 with one of its edges (sidewall) being bisected by an imaginary line on the second major surface 26 of the first plate 21 that connects two of its opposing vertices. In one specific embodiment, the triangular prism comprised an equilateral triangle and the rhombus was bisected by the second plate into two triangles similar in size and shape to the equilateral triangle of the second plate and seen in FIG. 3. In one specific embodiment, the predetermined angle β was 90 degrees and the draft angle α for the first plate was 90 degrees and for the second plate was 90 degrees.

Figures 4A, 4B:
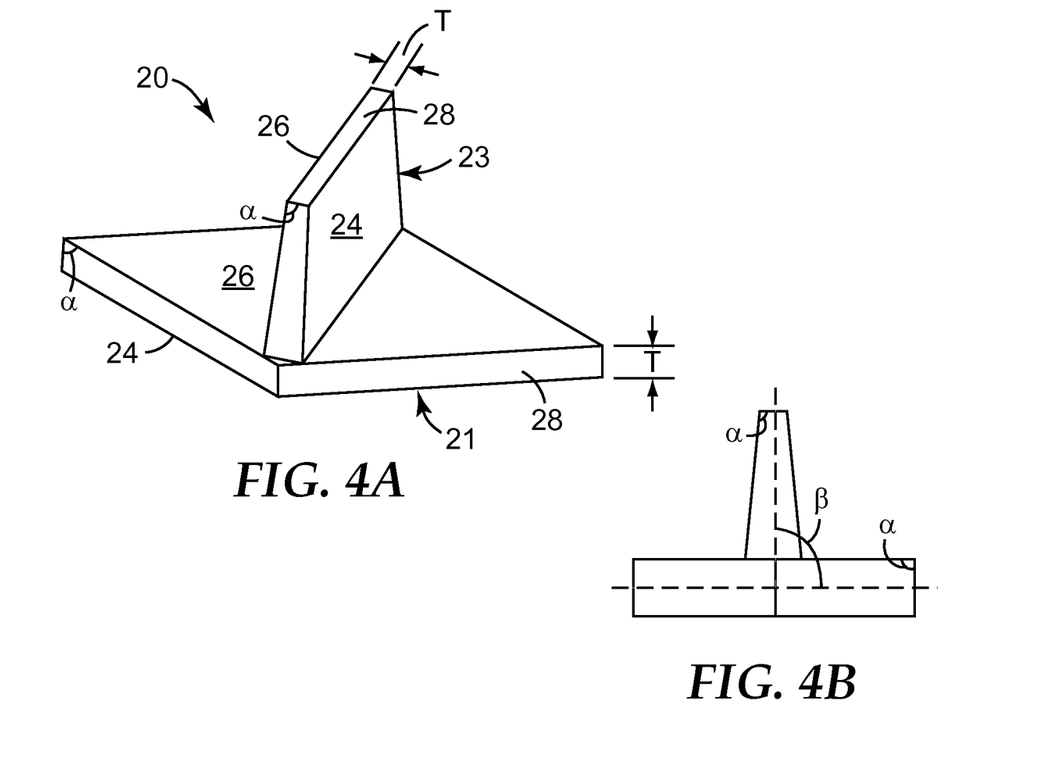
FIGS. 4A and 4B illustrate another embodiment of the intersecting plate shaped abrasive particles comprising a first plate and a second plate.

In another embodiment, shown in FIG. 4 the first plate 21 comprised a rhombus (diamond) prism and the second plate 23 comprised a rectangular (trapezoid) prism. In other embodiments, both plates can be truncated pyramids or one of the plates can be a prism while the other plate is a truncated pyramid. The second plate 23 can be located on the second major surface 26 of the first plate 21 with one of its edges (sidewall) being bisected by an imaginary line on the second major surface 26 of the first plate 21 that connects two of its opposing vertices. In one specific embodiment, the predetermined angle β was 90 degrees and the draft angle α for the first plate was 90 degrees and for the second plate was 90 degrees.

In various embodiments of the invention, the second plate 23 (smaller plate) can be sized such the intersecting edge of the second plate is entirely contained within the perimeter of the first or second major surface on the first plate 21 it intersects with. Alternatively, the second plate 23 can be sized or located such the intersecting edge of the second plate extends past the perimeter of the first or second major surface on the first plate 21 it intersects with. The extension can be accomplished by making the plates the same size and shape and simply offsetting their intersection, or one plate can be made larger (longer) than the plate it intersects with to over hang the surface perimeter on one or more edges.

In various embodiments of the invention, the draft angle α can be between approximately 90 degrees to approximately 135 degrees, or between approximately 95 degrees to approximately 130 degrees, or between about 95 degrees to about 125 degrees, or between about 95 degrees to about 120 degrees, or between about 95 degrees to about 115 degrees, or between about 95 degrees to about 110 degrees, or between about 95 degrees to about 105 degrees, or between about 95 degrees to about 100 degrees. As discussed in U.S. patent application Ser. No. 12/337,075 entitled "Shaped Abrasive Particles With A Sloping Sidewall" filed on Dec. 17, 2008, specific ranges for the draft angle α have been found to produce surprising increases in the grinding performance of coated abrasive articles made from the shaped abrasive particles with a sloping sidewall. In particular, draft angles of 98 degrees, 120 degrees, or 135 degrees have been found to have improved grinding performance over a draft angle of 90 degrees. The improvement in grinding performance is particularly pronounced at draft angles of 98 degrees or 120 degrees as seen in FIGS. 6 and 7 of U.S. patent application Ser. No. 12/337,075. Different angles or the same angle for the draft angle α can be used with any of the plates forming the shaped abrasive particle. When the intersecting plate shaped abrasive particles are tipped or otherwise attached to the abrasive article by one of the sloping sidewalls instead of by the first major surface 24 of the first plate 21, angles in the above ranges can increase grinding performance in a similar manor.

Similarly, it is believed that a predetermined angle β other than 90 degrees results in enhanced cutting performance of the intersecting plate shaped abrasive particles; although, a 90 degree angle can be used as well. In various embodiments of the invention, the predetermined angle β can be between about 20 degrees to about 85 degrees, or between about 55 degrees to about 85 degrees, or between about 60 degrees to about 85 degrees, or between about 65 degrees to about 85 degrees, or between about 70 degrees to about 85 degrees, or between about 75 degrees to about 85 degrees, or between about 80 degrees to about 85 degrees. Controlling the predetermined angle β can control the rake angle of the second plate relative to the workpiece in a coated abrasive article as best seen in FIG. 5.

In various embodiments of the invention, the first and second plates (21, 23) can include additional features. In some embodiments, the first major surface 24 is substantially planar, the second major surface 26 is substantially planar, or both are substantially planar. Alternatively, one side could be concave or recessed as discussed in more detail in copending U.S. patent application Ser. No. 12/336,961 entitled "Dish-Shaped Abrasive Particles With A Recessed Surface", filed on Dec. 17, 2008. A concave or recessed 50 surface can be created by selecting drying conditions for the sol gel while residing in the mold cavity that forms a meniscus in the sol gel tending to wick the edges of the sol gel up the sides of the mold as discussed in U.S. patent application Ser. No. 12/336,961. A concave surface may help to increase the cutting performance in some applications similar to a hollow ground chisel blade.

Additionally, one or more openings passing through the first major surface 24 and the second major surface 26 could be present in the plates as discussed in more detail in copending U.S. patent application Ser. No. 12/337,112 entitled "Shaped Abrasive Particles With An Opening", filed on Dec. 17, 2008. An opening through the plate(s) can reduce the bulk density of the shaped abrasive particles thereby increasing the porosity of the resulting abrasive article in some applications, such as a grinding wheel, where increased porosity is often desired. Alternatively, the opening can reduce shelling by anchoring the particle into the size coat more firmly or the opening can act as a reservoir for a grinding aid. An opening can be formed into the shaped abrasive particle by selecting drying conditions that exaggerate the meniscus phenomenon discussed above, or by making a mold having one or more posts extending from the mold's surface. Methods of making shaped abrasive particles with an opening are discussed in U.S. patent application Ser. No. 12/337,112.

Additionally, the shaped abrasive particles can have a plurality of grooves on the first or second major surface as described in copending provisional application U.S. Ser. No. 61/138,268 entitled "Shaped Abrasive Particles With Grooves" filed on Dec. 17, 2008. The grooves are formed by a plurality of ridges in the surface of the mold cavity that have been found to make it easier to remove the precursor shaped abrasive particles from the mold. It is believed that a ridge having a triangular shaped cross section acts as a wedge lifting the precursor shaped abrasive particle off of the mold's bottom surface under drying conditions that promote shrinkage of the sol gel while residing in the mold cavity.

Shaped abrasive particles 20 made according to the present disclosure can be incorporated into an abrasive article, or used in loose form. Abrasive particles are generally graded to a given particle size distribution before use. Such distributions typically have a range of particle sizes, from coarse particles to fine particles. In the abrasive art this range is sometimes referred to as a "coarse", "control", and "fine" fractions. Abrasive particles graded according to abrasive industry accepted grading standards specify the particle size distribution for each nominal grade within numerical limits. Such industry accepted grading standards (i.e., abrasive industry specified nominal grade) include those known as the American National Standards Institute, Inc. (ANSI) standards, Federation of European Producers of Abrasive Products (FEPA) standards, and Japanese Industrial Standard (JIS) standards.

ANSI grade designations (i.e., specified nominal grades) include: ANSI 4, ANSI 6, ANSI 8, ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600. FEPA grade designations include P8, P12, P16, P24, P36, P40, P50, P60, P80, P100, P120, P150, P180, P220, P320, P400, P500, P600, P800, P1000, and P1200. JIS grade designations include JIS8, JIS12, JIS16, JIS24, JIS36, JIS46, JIS54, JIS60, JIS80, JIS100, JIS150, JIS180, JIS220, JIS240, JIS280, JIS320, JIS360, JIS400, JIS600, JIS800, JIS1000, JIS1500, JIS2500, JIS4000, JIS6000, JIS8000, and JIS10,000.

Alternatively, the shaped abrasive particles 20 can graded to a nominal screened grade using U.S.A. Standard Test Sieves conforming to ASTM E-11 "Standard Specification for Wire Cloth and Sieves for Testing Purposes." ASTM E-11 prescribes the requirements for the design and construction of testing sieves using a medium of woven wire cloth mounted in a frame for the classification of materials according to a designated particle size. A typical designation may be represented as −18+20 meaning that the shaped abrasive particles pass through a test sieve meeting ASTM E-11 specifications for the number 18 sieve and are retained on a test sieve meeting ASTM E-11 specifications for the number 20 sieve. In one embodiment, the shaped abrasive particles 20 have a particle size such that most of the particles pass through an 18 mesh test sieve and can be retained on a 20, 25, 30, 35, 40, 45, or 50 mesh test sieve. In various embodiments of the invention, the shaped abrasive particles 20 can have a nominal screened grade comprising: −18+20, −20/+25, −25+30, −30+35, −35+40, −40+45, −45+50, −50+60, −60+70, −70/+80, −80+100, −100+120, −120+140, −140+170, −170+200, −200+230, −230+270, −270+325, −325+400, −400+450, −450+500, or −500+635. Alternatively, a custom mesh size could be used such as −90+100.

In one aspect, the present disclosure provides a plurality of shaped abrasive particles having an abrasives industry specified nominal grade or nominal screened grade, wherein at least a portion of the plurality of abrasive particles are shaped abrasive particles 20. In another aspect, the disclosure provides a method comprising grading the shaped abrasive particles 20 made according to the present disclosure to provide a plurality of shaped abrasive particles 20 having an abrasives industry specified nominal grade or a nominal screened grade.

If desired, the shaped abrasive particles 20 having an abrasives industry specified nominal grade or a nominal screened grade can be mixed with other known abrasive or non-abrasive particles. In some embodiments, at least 5, 10, 15, 20, 25, 30, 35, 40, 45, 50, 55, 60, 65, 70, 75, 80, 85, 90, 95, or even 100 percent by weight of the plurality of abrasive particles having an abrasives industry specified nominal grade or a nominal screened grade are shaped abrasive particles 20 made according to the present disclosure, based on the total weight of the plurality of abrasive particles.

Particles suitable for mixing with the shaped abrasive particles 20 include conventional abrasive grains, diluent grains, or erodable agglomerates, such as those described in U.S. Pat. Nos. 4,799,939 and 5,078,753. Representative examples of conventional abrasive grains include fused aluminum oxide, silicon carbide, boron carbide garnet, fused alumina zirconia, cubic boron nitride, diamond, and the like. Representative examples of diluent grains include marble, gypsum, and glass. Blends of different geometrically shaped abrasive particles 20 or blends of shaped abrasive particles 20 with sloping sidewalls having different draft angles or different predetermined angles β can be used in the articles of this invention.

For some applications, blends of shaped abrasive particles and conventional abrasive grains have been found to work well. In these applications, even a small amount of the shaped abrasive particles, such as 10% by weight, significantly boost performance. In blends of shaped abrasive particles with conventional abrasive grains or diluent grains, the weight of the shaped abrasive particles in the blend can be less than or equal to 50, 40, 30, 25, 20, 15, or 10% and still provide a significant performance increase.

The shaped abrasive particles 20 may also have a surface coating. Surface coatings are known to improve the adhesion between abrasive grains and the binder in abrasive articles or can be used to aid in electrostatic deposition of the shaped abrasive particles 20. In one embodiment, surface coatings as described in U.S. Pat. No. 5,352,254 in an amount of 0.1%-2% inorganics to shaped abrasive particle weight were used. Such surface coatings are described in U.S. Pat. Nos. 5,213,591; 5,011,508; 1,910,444; 3,041,156; 5,009,675; 5,085,671; 4,997,461; and 5,042,991. Additionally, the surface coating may prevent the shaped abrasive particle from capping. Capping is the term to describe the phenomenon where metal particles from the workpiece being abraded become welded to the tops of the shaped abrasive particles. Surface coatings to perform the above functions are known to those of skill in the art.

Abrasive Articles Having Intersecting Plate Shaped Abrasive Particles

Referring to FIG. 5, a coated abrasive article 54 comprises a backing 56 having a first layer of binder, hereinafter referred to as the make coat 58, applied over a first major surface 60 of backing 56. Attached or partially embedded in the make coat 58 are a plurality of shaped abrasive particles 20 forming an abrasive layer. Over the shaped abrasive particles 20 is a second layer of binder, hereinafter referred to as the size coat 62. The purpose of make coat 58 is to secure shaped abrasive particles 20 to the backing 56 and the purpose of size coat 62 is to reinforce shaped abrasive particles 20. An optional supersize coating, as known to those of skill in the art, may also be applied.

As seen, the shaped abrasive particles 20 can be attached to the backing 56 by the first plate 21. Since the second plate 23 is joined to the first plate 21 at a predetermined angle β, the rake angle of the second plate 23 to a workpiece 64 while abrading the workpiece can be precisely controlled. The ability to control the rake angle can enhance the cutting performance of the abrasive article or the finish of the abrasive article.

Figure 6:
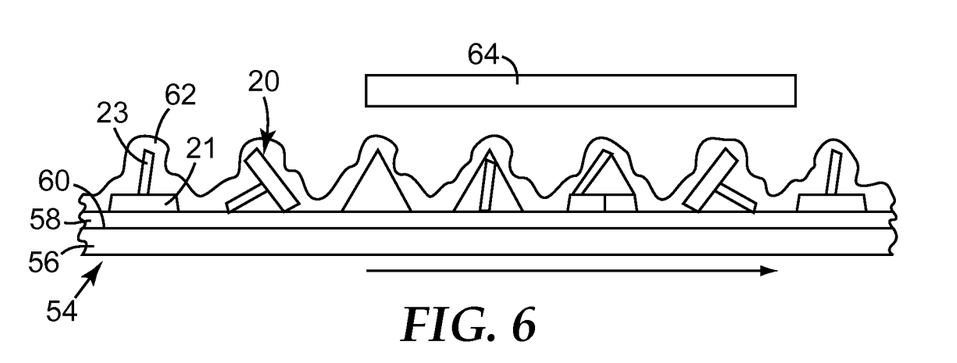
FIG. 6 illustrates another coated abrasive article containing the intersecting plate shaped abrasive particles comprising a first plate and a second plate.

In another embodiment shown in FIG. 6, the intersecting plate shaped abrasive particles (FIG. 1) are drop coated to form the coated abrasive particle. Even when drop coating is used, as opposed to electrostatic coating, the intersecting plate shaped abrasive particles tend to orient such that a vertex of one of the triangular plates is present to contact the workpiece during grinding. The result is especially pronounced if an open coat abrasive layer is used and excess shaped abrasive particles are not added such that they fall on top of previously applied shaped abrasive particles.

To optimize the orientation, the intersecting plate shaped abrasive particles can be applied to the backing in an open coat abrasive layer in FIGS. 5 and 6. An open coat abrasive layer will result in less than 100% coverage of the make coat with abrasive particles thereby leaving open areas and a visible resin layer between the abrasive particles. In various embodiments of the invention, the percent open area in the abrasive layer can be from 10% to about 90% or from about 30% to about 80%.

The make coat 58 and size coat 62 comprise a resinous adhesive. The resinous adhesive of the make coat 58 can be the same as or different from that of the size coat 62. Examples of resinous adhesives that are suitable for these coats include phenolic resins, epoxy resins, urea-formaldehyde resins, acrylate resins, aminoplast resins, melamine resins, acrylated epoxy resins, urethane resins and combinations thereof. In addition to the resinous adhesive, the make coat 58 or size coat 62, or both coats, may further comprise additives that are known in the art, such as, for example, fillers, grinding aids, wetting agents, surfactants, dyes, pigments, coupling agents, adhesion promoters, and combinations thereof. Examples of fillers include calcium carbonate, silica, talc, clay, calcium metasilicate, dolomite, aluminum sulfate and combinations thereof.

A grinding aid can be applied to the coated abrasive article. A grinding aid is defined as particulate material, the addition of which has a significant effect on the chemical and physical processes of abrading, thereby resulting in improved performance. Grinding aids encompass a wide variety of different materials and can be inorganic or organic. Examples of chemical groups of grinding aids include waxes, organic halide compounds, halide salts, and metals and their alloys. The organic halide compounds will typically break down during abrading and release a halogen acid or a gaseous halide compound. Examples of such materials include chlorinated waxes, such as tetrachloronaphthalene, pentachloronaphthalene; and polyvinyl chloride. Examples of halide salts include sodium chloride, potassium cryolite, sodium cryolite, ammonium cryolite, potassium tetrafluoroborate, sodium tetrafluoroborate, silicon fluorides, potassium chloride, and magnesium chloride. Examples of metals include tin, lead, bismuth, cobalt, antimony, cadmium, iron, and titanium. Other grinding aids include sulfur, organic sulfur compounds, graphite, and metallic sulfides. It is also within the scope of this invention to use a combination of different grinding aids; in some instances, this may produce a synergistic effect. In some embodiments, the grinding aid is preferably cryolite or potassium tetrafluoroborate. The amount of such additives can be adjusted to give desired properties. It is also within the scope of this invention to utilize a supersize coating. The supersize coating typically contains a binder and a grinding aid. The binders can be formed from such materials as phenolic resins, acrylate resins, epoxy resins, urea-formaldehyde resins, melamine resins, urethane resins, and combinations thereof. In some embodiments, a supersize coating comprising a thermosetting epoxy resin, a curative, a thermoplastic hydrocarbon resin, a grinding aid, a dispersing agent, and a pigment is used as disclosed in U.S. Pat. No. 5,441,549 (Helmin).

It is also within the scope of this invention that the shaped abrasive particles 20 can be utilized in a bonded abrasive article, a nonwoven abrasive article, or abrasive brushes. A bonded abrasive comprises a plurality of the shaped abrasive particles 20 bonded together by means of a binder to form a shaped mass. The binder for a bonded abrasive can be metallic, organic, ceramic, or vitreous. A nonwoven abrasive comprises a plurality of the shaped abrasive particles 20 bonded to a fibrous nonwoven web by means of an organic binder.

Figure 7:
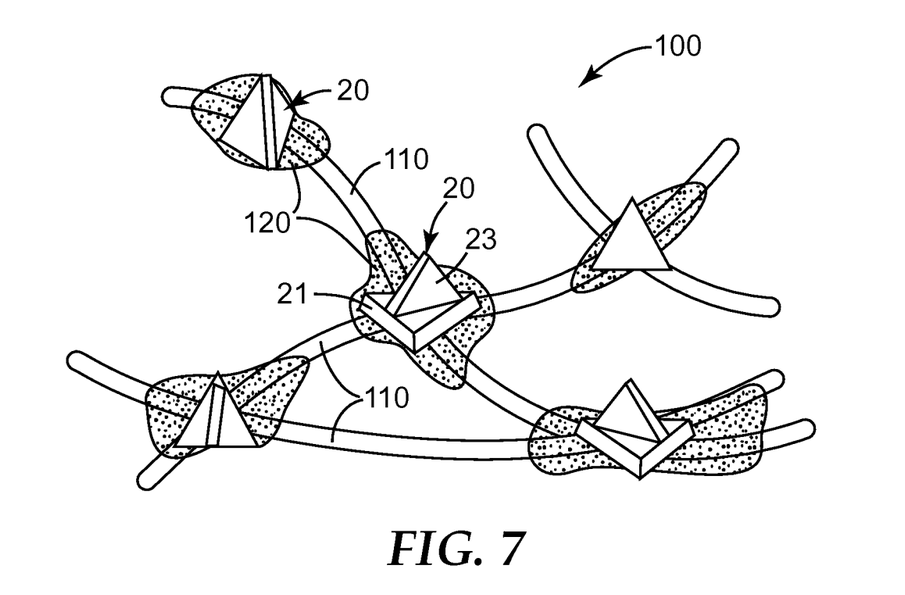
FIG. 7 illustrates a nonwoven abrasive article containing the intersecting plate shaped abrasive particles comprising a first plate and a second plate.

Referring specifically to FIG. 7, a nonwoven abrasive article comprises a fibrous web 100 formed of entangled filaments 110 held together by a binder 120 such as a polyurethane binder. Intersecting plate shaped abrasive particles 20 are dispersed throughout the fibrous web 100 on the exposed surfaces of the filaments 110. The binder 120 coats at least a portion of the filaments 110 and adheres the shaped abrasive particles to the nonwoven web. For some of the intersecting plate shaped abrasive particles, at least a portion of the filament 110 contacts both the first plate 21 and the second plate 23 simultaneously. Since more area of the intersecting plate shaped abrasive particles can come into contact with filaments, better adhesion of the shaped abrasive particles to the filaments can result.

Method of Making Intersecting Plate Shaped Abrasive Particles

Materials that can be made into shaped ceramic objects using the process of the invention include physical precursors such as finely divided particles of known ceramic materials such as alpha alumina, silicon carbide, alumina/zirconia and boron carbide. Also included are chemical and/or morphological precursors such as aluminum trihydrate, boehmite, gamma alumina and other transitional aluminas and bauxite. The most useful of the above are typically based on alumina and its physical or chemical precursors. It is to be understood however that the invention is not so limited but is capable of being adapted for use with a plurality of different precursor materials.

Other components that have been found to be desirable in certain circumstances for the production of alumina-based particles include nucleating agents such as finely divided alpha alumina, ferric oxide, chromium oxide and other materials capable of nucleating the transformation of precursor forms to the alpha alumina form; magnesia; titania; zirconia; yttria; and rare earth metal oxides. Such additives often act as crystal growth limiters or boundary phase modifiers. The amount of such additives in the precursor is usually less than about 10% and often less than 5% by weight (solids basis).

It is also possible to use, instead of a chemical or morphological precursor of alpha alumina, a slip of finely divided alpha alumina itself together with an organic compound that will maintain it in suspension and act as a temporary binder while the particle is being fired to essentially full densification. In such cases, it is often possible to include in the suspension materials that will form a separate phase upon firing or that can act as an aid in maintaining the structural integrity of the shaped particles either during drying and firing, or after firing. Such materials may be present as impurities. If, for example, the precursor is finely divided bauxite, there will be a small proportion of vitreous material present that will form a second phase after the powder grains are sintered together to form the shaped particle.

The dispersion that is employed in the process of the invention may be any dispersion of a ceramic precursor such as a finely dispersed material that, after being subjected to the process of the invention, is in the form of a shaped ceramic article. The dispersion may be chemically a precursor, as for example boehmite is a chemical precursor of alpha alumina; a morphological precursor as for example gamma alumina is a morphological precursor of alpha alumina; as well as (or alternatively), physically a precursor in the sense of that a finely divided form of alpha alumina can be formed into a shape and sintered to retain that shape.

Where the dispersion comprises a physical or morphological precursor as the term is used herein, the precursor is in the form of finely divided powder grains that, when sintered together, form a ceramic article, such as an abrasive particle of utility in conventional bonded and coated abrasive applications. Such materials generally comprise powder grains with an average size of less than about 20 microns, preferably less than about 10 microns and most preferably less than about a micron.

The dispersion used in a preferred process is most conveniently a boehmite sol gel. The sol gel may be a seeded sol gel that comprises finely dispersed seed particles capable of nucleating the conversion of alumina precursors to alpha alumina or an unseeded sol gel that transforms into alpha alumina when sintered.

The solids content of the dispersion of a physical or a morphological precursor is preferably from about 40 to 65% though higher solids contents of up to about 80% can be used. An organic compound is frequently used along with the finely divided grains in such dispersions as a suspending agent or perhaps as a temporary binder until the formed particle has been dried sufficiently to maintain its shape. This can be any of those generally known for such purposes such as polyethylene glycol, sorbitan esters and the like.

The solids content of a precursor that changes to the final stable ceramic form upon heating may need to take into account water that may be liberated from the precursor during drying and firing to sinter the abrasive particles. In such cases the solids content is typically somewhat lower such as about 75% or lower or even between about 30% and about 50%. With a boehmite sol gel, a maximum solids content of about 60% or even 40% can be used and a sol gel with a peptized minimum solids content of about 20% may also be used.

Abrasive particles made from physical precursors will typically need to be fired at higher temperatures than those formed from a seeded chemical precursor. For example, whereas particles of a seeded boehmite sol gel form an essentially fully densified alpha alumina at temperatures below about 1250 degrees C., particles made from unseeded boehmite sol gels may require a firing temperature of above about 1400 degrees C. for full densification.

In one embodiment of making the intersecting plate shaped abrasive particles, seven process steps can be utilized. The first process step involves providing either a seeded on non-seeded abrasive dispersion that can be converted into alpha alumina. The alpha alumina precursor composition often comprises a liquid that is a volatile component. In one embodiment, the volatile component is water. The abrasive dispersion should comprise a sufficient amount of liquid for the viscosity of the abrasive dispersion to be sufficiently low to enable filling the mold cavities and replicating the mold surfaces, but not so much liquid as to cause subsequent removal of the liquid from the mold cavity to be prohibitively expensive. In one embodiment, the abrasive dispersion comprises from 2 percent to 90 percent by weight of the particles that can be converted into alpha alumina, such as particles of aluminum oxide monohydrate (boehmite), and at least 10 percent by weight, or from 50 percent to 70 percent, or 50 percent to 60 percent, by weight of the volatile component such as water. Conversely, the abrasive dispersion in some embodiments contains from 30 percent to 50 percent, or 40 percent to 50 percent, by weight solids.

Aluminum oxide hydrates other than boehmite can also be used. Boehmite can be prepared by known techniques or can be obtained commercially. Examples of commercially available boehmite include products having the trademarks "DISPERAL", and "DISPAL", both available from Sasol North America, Inc. or "HiQ-40" available from BASF Corporation. These aluminum oxide monohydrates are relatively pure, i.e., they include relatively little, if any, hydrate phases other than monohydrates, and have a high surface area. The physical properties of the resulting shaped abrasive particles 20 will generally depend upon the type of material used in the abrasive dispersion.

In one embodiment, the abrasive dispersion is in a gel state. As used herein, a "gel" is a three dimensional network of solids dispersed in a liquid. The abrasive dispersion may contain a modifying additive or precursor of a modifying additive. The modifying additive can function to enhance some desirable property of the abrasive particles or increase the effectiveness of the subsequent sintering step. Modifying additives or precursors of modifying additives can be in the form of soluble salts, typically water soluble salts. They typically consist of a metal-containing compound and can be a precursor of oxide of magnesium, zinc, iron, silicon, cobalt, nickel, zirconium, hathium, chromium, yttrium, praseodymium, samarium, ytterbium, neodymium, lanthanum, gadolinium, cerium, dysprosium, erbium, titanium, and mixtures thereof. The particular concentrations of these additives that can be present in the abrasive dispersion can be varied based on skill in the art. Typically, the introduction of a modifying additive or precursor of a modifying additive will cause the abrasive dispersion to gel. The abrasive dispersion can also be induced to gel by application of heat over a period of time. The abrasive dispersion can also contain a nucleating agent (seeding) to enhance the transformation of hydrated or calcined aluminum oxide to alpha alumina. Nucleating agents suitable for this disclosure include fine particles of alpha alumina, alpha ferric oxide or its precursor, titanium oxides and titanates, chrome oxides, or any other material that will nucleate the transformation. The amount of nucleating agent, if used, should be sufficient to effect the transformation of alpha alumina. Nucleating such abrasive dispersions is disclosed in U.S. Pat. No. 4,744,802 to Schwabel.

A peptizing agent can be added to the abrasive dispersion to produce a more stable hydrosol or colloidal abrasive dispersion. Suitable peptizing agents are monoprotic acids or acid compounds such as acetic acid, hydrochloric acid, formic acid, and nitric acid. Multiprotic acids can also be used but they can rapidly gel the abrasive dispersion, making it difficult to handle or to introduce additional components thereto. Some commercial sources of boehmite contain an acid titer (such as absorbed formic or nitric acid) that will assist in forming a stable abrasive dispersion.

The abrasive dispersion can be formed by any suitable means, such as, for example, by simply mixing aluminum oxide monohydrate with water containing a peptizing agent or by forming an aluminum oxide monohydrate slurry to which the peptizing agent is added. Defoamers or other suitable chemicals can be added to reduce the tendency to form bubbles or entrain air while mixing. Additional chemicals such as wetting agents, alcohols, or coupling agents can be added if desired. The alpha alumina abrasive grain may contain silica and iron oxide as disclosed in U.S. Pat. No. 5,645,619 to Erickson et al. on Jul. 8, 1997. The alpha alumina abrasive grain may contain zirconia as disclosed in U.S. Pat. No. 5,551,963 to Larmie on Sep. 3, 1996. Alternatively, the alpha alumina abrasive grain can have a microstructure or additives as disclosed in U.S. Pat. No. 6,277,161 to Castro on Aug. 21, 2001.

The second process step involves providing a mold having at least one mold cavity, and preferably a plurality of cavities.

The cavity has a specified three-dimensional shape to make the shaped abrasive particles illustrated in FIGS. 1-4. The mold can have a first mold cavity corresponding to the shape of the first plate 2 and a second mold cavity corresponding to the shape of the second plate 23 intersecting at a predetermined angle with the first mold cavity. In general, the first mold cavity will be adjacent to the mold's upper surface with the perimeter of the cavity in the upper surface forming the perimeter of the first major surface 24 of the first plate 21. The second mold cavity will intersect with and extend into the thickness of the mold from the bottom of the first mold cavity which forms the second major surface 26 of the first plate 21.

The plurality of cavities can be formed in a production tool. The production tool can be a belt, a sheet, a continuous web, a coating roll such as a rotogravure roll, a sleeve mounted on a coating roll, or die. In one embodiment, the production tool comprises polymeric material. Examples of suitable polymeric materials include thermoplastics such as polyesters, polycarbonates, poly(ether sulfone), poly(methyl methacrylate), polyurethanes, polyvinylchloride, polyolefin, polystyrene, polypropylene, polyethylene or combinations thereof, or thermosetting materials. In one embodiment, the entire tooling is made from a polymeric or thermoplastic material. In another embodiment, the surfaces of the tooling in contact with the sol-gel while drying, such as the surfaces of the plurality of cavities, comprises polymeric or thermoplastic materials and other portions of the tooling can be made from other materials. A suitable polymeric coating may be applied to a metal tooling to change its surface tension properties by way of example.

A polymeric or thermoplastic tool can be replicated from a metal master tool. The master tool will have the inverse pattern desired for the production tool. The master tool can be made in the same manner as the production tool. In one embodiment, the master tool is made out of metal, e.g., nickel and is diamond turned. The polymeric sheet material can be heated along with the master tool such that the polymeric material is embossed with the master tool pattern by pressing the two together. A polymeric or thermoplastic material can also be extruded or cast onto the master tool and then pressed. The thermoplastic material is cooled to solidify and produce the production tool. If a thermoplastic production tool is utilized, then care should be taken not to generate excessive heat that may distort the thermoplastic production tool limiting its life. More information concerning the design and fabrication of production tooling or master tools can be found in U.S. Pat. No. 5,152,917 (Pieper et al.); U.S. Pat. No. 5,435,816 (Spurgeon et al.); U.S. Pat. No. 5,672,097 (Hoopman et al.); U.S. Pat. No. 5,946,991 (Hoopman et al.); U.S. Pat. No. 5,975,987 (Hoopman et al.); and U.S. Pat. No. 6,129,540 (Hoopman et al.).

Access to cavities can be from an opening in the top surface. In one embodiment, the top surface is substantially parallel to bottom surface of the mold with the cavities having a substantially uniform depth. One side of the mold, i.e. the side in which the cavity is formed, can remain exposed to the surrounding atmosphere during the step in which the volatile component is removed.

The third process step involves filling the cavities in the mold with the abrasive dispersion by any conventional technique. In some embodiments, a knife roll coater or vacuum slot die coater can be used. A mold release can be used to aid in removing the particles from the mold if desired. Typical mold release agents include oils such as peanut oil or mineral oil, fish oil, silicones, polytetrafluoroethylene, zinc sterate, and graphite. In general, between about 0.1% to about 5% by weight mold release agent, such as peanut oil, in a liquid, such as water or alcohol, is applied to the surfaces of the production tooling in contact with the sol-gel such that between about 0.1 mg/in$^2$ to about 3.0 mg/in$^2$, or between about 0.1 mg/in$^2$ to about 5.0 mg/in$^2$ of the mold release agent is present per unit area of the mold when a mold release is desired. In one embodiment, the top surface of the mold is coated with the abrasive dispersion. The abrasive dispersion can be pumped or applied onto top surface. Next, a scraper or leveler bar can be used to force the abrasive dispersion fully into the cavity of the mold. The remaining portion of the abrasive dispersion that does not enter cavity can be removed from top surface of the mold and recycled. In some embodiments, a small portion of the abrasive dispersion can remain on the top surface and in other embodiments the top surface is substantially free of the dispersion. The pressure applied by the scraper or leveler bar is typically less than 100 psi, or less than 50 psi, or less than 10 psi. In some embodiments, no exposed surface of the abrasive dispersion extends substantially beyond the top surface to ensure uniformity in thickness of the resulting shaped abrasive particles 20.

The fourth process step involves removing the volatile component to dry the dispersion. Desirably, the volatile component is removed by fast evaporation rates. In some embodiments, removal of the volatile component by evaporation occurs at temperatures above the boiling point of the volatile component. An upper limit to the drying temperature often depends on the material the mold is made from. For polypropylene tooling the temperature should be less than the melting point of the plastic.

In one embodiment, for a water dispersion of between about 40 to 50 percent solids and a polypropylene mold, the drying temperatures can be between about 90 degrees C. to about 165 degrees C., or between about 105 degrees C. to about 150 degrees C., or between about 105 degrees C. to about 120 degrees C. Higher temperatures can lead to improved production speeds but can also lead to degradation of the polypropylene tooling limiting its useful life as a mold.

The fifth process step involves removing the precursor shaped abrasive particles from the mold cavities. The precursor shaped abrasive particles can be removed from the cavities by using the following processes alone or in combination on the mold: gravity, vibration, ultrasonic vibration, vacuum, or pressurized air to remove the particles from the mold cavities.

The precursor abrasive particles can be further dried outside of the mold. If the abrasive dispersion is dried to the desired level in the mold, this additional drying step is not necessary. However, in some instances it may be economical to employ this additional drying step to minimize the time that the abrasive dispersion resides in the mold. Typically, the precursor shaped abrasive particles will be dried from 10 to 480 minutes, or from 120 to 400 minutes, at a temperature from 50 degrees C. to 160 degrees C., or at 120 degrees C. to 150 degrees C.

The sixth process step involves calcining the precursor shaped abrasive particles. During calcining, essentially all the volatile material is removed, and the various components that were present in the abrasive dispersion are transformed into metal oxides. The precursor shaped abrasive particles are generally heated to a temperature from 400 degrees C. to 800 degrees C., and maintained within this temperature range until the free water and over 90 percent by weight of any bound volatile material are removed. In an optional step, it may be desired to introduce the modifying additive by an impregnation process. A water-soluble salt can be introduced by impregnation into the pores of the calcined, precursor shaped abrasive particles. Then the precursor shaped abrasive particles are calcined again. This option is further described in European Patent Application No. 293,163.

The seventh process step involves sintering the calcined, precursor shaped abrasive particles to form alpha alumina particles. Prior to sintering, the calcined, precursor shaped abrasive particles are not completely densified and thus lack the desired hardness to be used as shaped abrasive particles. Sintering takes place by heating the calcined, precursor shaped abrasive particles to a temperature of from 1,000 degrees C. to 1,650 degrees C. and maintaining them within this temperature range until substantially all of the alpha alumina monohydrate (or equivalent) is converted to alpha alumina and the porosity is reduced to less than 15 percent by volume. The length of time to which the calcined, precursor shaped abrasive particles must be exposed to the sintering temperature to achieve this level of conversion depends upon various factors but from five seconds to 48 hours is typical. In another embodiment, the duration for the sintering step ranges from one minute to 90 minutes. After sintering, the shaped abrasive particles can have a Vickers hardness of 10 GPa, 16 GPa, 18 GPa, 20 GPa, or greater.

Other steps can be used to modify the described process, such as rapidly heating the material from the calcining temperature to the sintering temperature, centrifuging the abrasive dispersion to remove sludge, waste, etc. Moreover, the process can be modified by combining two or more of the process steps if desired. Conventional process steps that can be used to modify the process of this disclosure are more fully described in U.S. Pat. No. 4,314,827 to Leitheiser.

More information concerning methods to make shaped abrasive particles is disclosed in copending U.S. patent application Ser. No. 12/337,001 entitled "Method Of Making Abrasive Shards, Shaped Abrasive Particles With An Opening, Or Dish-Shaped Abrasive Particles", filed on Dec. 17, 2008

EXAMPLES

Example 1 and Comparative Example A

Figure 8:
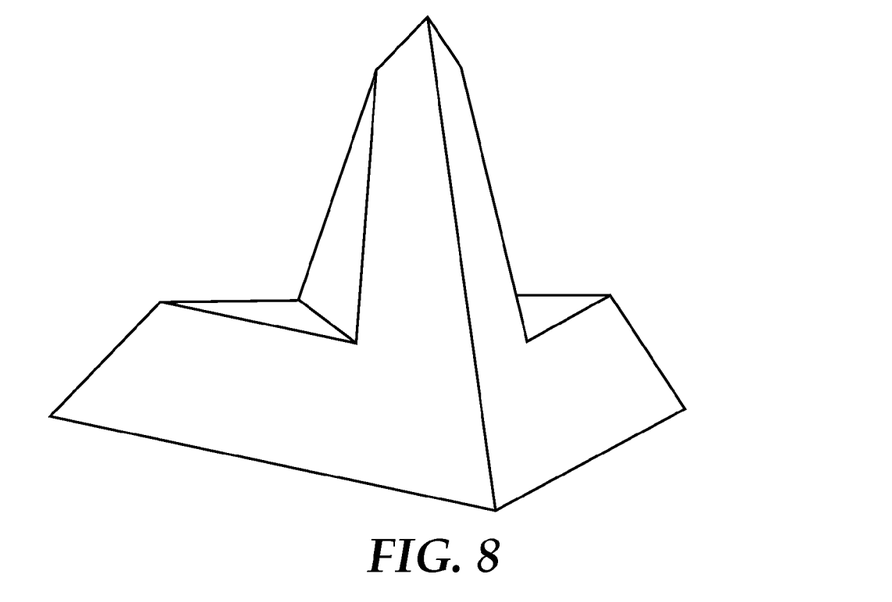
FIG. 8 illustrates another intersecting plate shaped abrasive particle comprising a first plate and a second plate.

Example 1 and comparative Example A were prepared to demonstrate the improved attributes of the intersecting plate shaped abrasive particles. The novel abrasive particles of Example 1 are shaped to have a specific geometry as shown in FIG. 8 to provide it with the sharpness required for a desired abrasive application. Such abrasive particles have the form of a triangular base plate with a planar plate protruding from one of the triangular surfaces. This abrasive is designed to have multiple very sharp edges Example 1

An alumina sol was prepared by combining 2316 grams deionized water and 66 grams of nitric acid in a high-shear mixer (Scott Turbon Mixer, Adelanto, Calif.) operating at 1601 RPM. 1600 grams of aluminum oxide monohydrate ("Disperal", Sasol North America, Houston Tex.) was added over one minute. After 5 minutes an additional 6 grams of nitric acid were added, after seven minutes of mixing 12 grams of peanut oil ("peanut oil, n.f.", Alnor Oil Company, Valley Stream, N.Y.) (0.75% based on Disperal content) was added to the mix and incorporated for 2 minutes. The batch size was 4000 grams. The sol was allowed to gel and age for 24 hours before use.

Figure 9A:
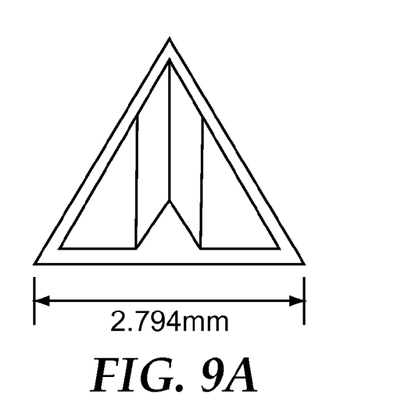
FIGS. 9A-9C illustrates the mold dimensions used to make the intersecting plated shaped abrasive particle of FIG. 8.
Figure 9B:
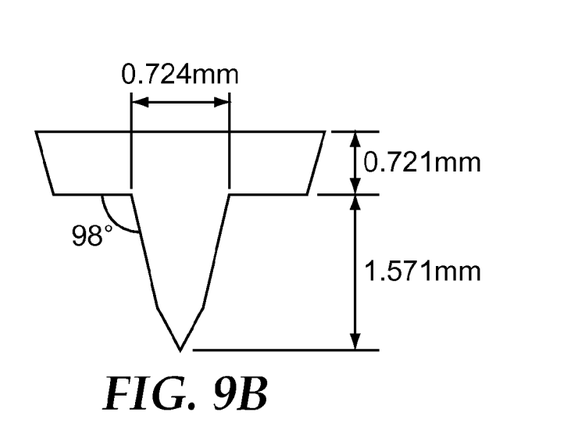
Figure 9C:
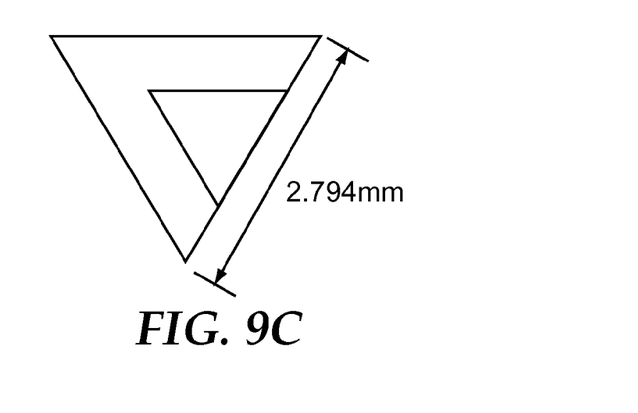
Figure 10:
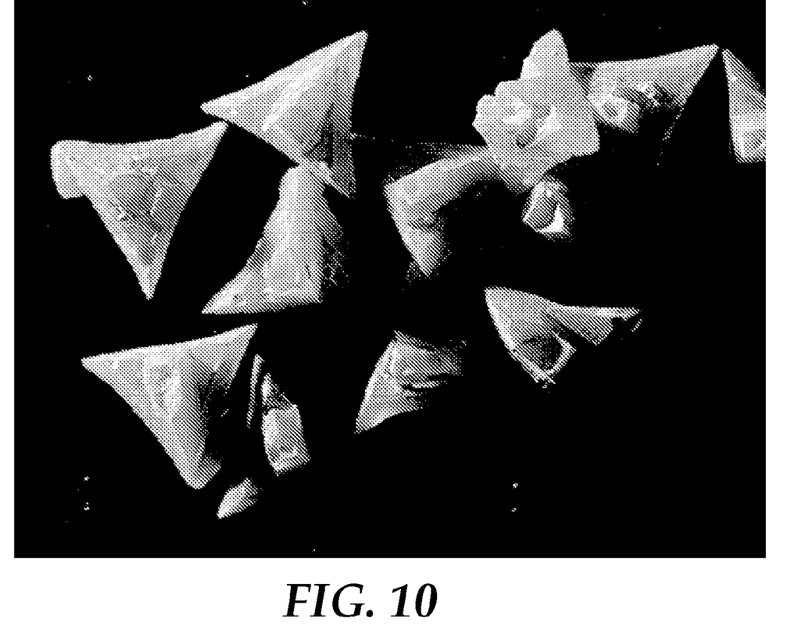
FIG. 10 shows intersecting plate shaped abrasive particles made by Example 1.

The sol gel was forced into the cavities of the microreplicated tool using a 5 inch wide stainless steel putty knife. The sol gel was forced into 9 in×13 in (23 cm×33 cm) piece of production tooling having cavities of dimensions as shown in FIGS. 9A-9C. The excess sol gel was carefully removed from the tooling with the putty knife. The coated tooling was then placed in an air convection oven at 45 degrees C. for 1.5 hours to remove water and dry the sol gel into shaped particles. The particles were removed from the tooling with the aid of an ultrasonic horn. The precursor shaped abrasive particles with 0.75% peanut oil were calcined at approximately 650 degrees C. (15 minutes) and then saturated with a mixed nitrate solution of the following concentration (reported as oxides): 1.0% of MgO, 1.2% Y2O3, 4.0% La2O3 and 0.05% CoO. The excess nitrate solution was removed and the saturated precursor intersecting shaped abrasive particles were allowed to dry after which the particles were again calcined at 650 degrees C. (15 minutes) and sintered at approximately 1400 degrees C. (5 minutes). Both the calcining and sintering was performed using rotary tube kilns. The abrasive particles produced using the above processes are shown in FIG. 10. Due to air entrapment, the tip of the protruding triangle tended to be truncated resulting in the three dimensional intersecting plate shaped abrasive particles shown.

Comparative Example A

Comparative Example A was prepared identically to Example 1 with the exception that a mold having a planar triangular mold cavity with each side of the larger face of the triangle 2.794 mm long, a mold depth of 0.711 mm, and a draft angle of 97 degrees was substituted for the intersecting plate mold used in Example 1. The shaped abrasive particles produced were the same or similar to shaped abrasive particles disclosed in U.S. patent publication 2010/0151196.

Example 2 and Comparative Example B

The nonwoven abrasives of Example 2 and Comparative Example B were prepared with the abrasive particles of Example 1 and Comparative Example A, respectively.

Example 2

Figure 11:
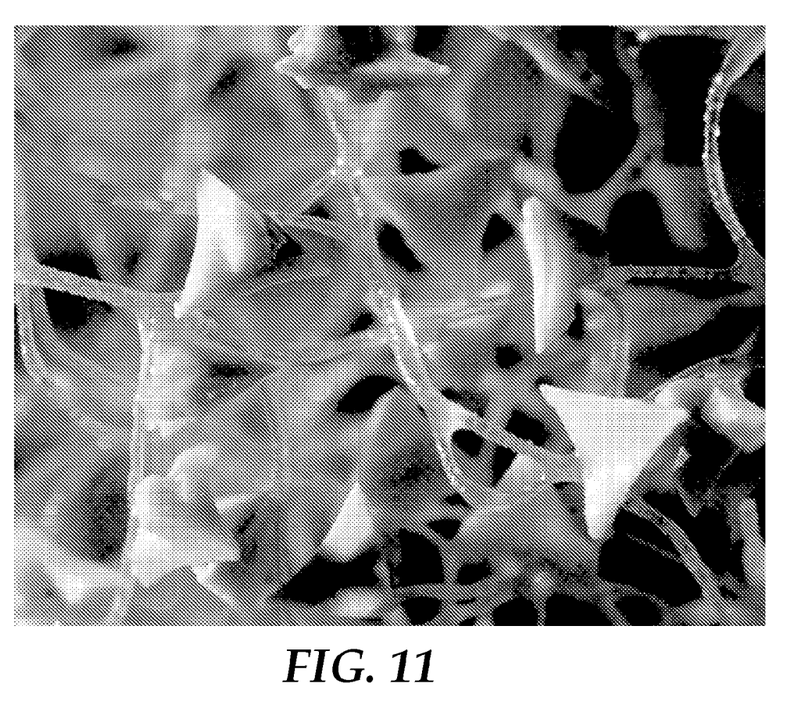
FIG. 11 shows a nonwoven abrasive article made by Example 2.

Example 2 was prepared by roll coating a conventionally prepared 126 g/m² nonwoven fabric of 70 denier (78 dtex)× 1.5 inch (38 mm) nylon 6,6 staple fibers that was lightly bonded with a polyurethane resin with the intersecting plate shaped abrasive particles of Example 1. To a 4×6 inch (10.2× 15.2 cm) piece of the nonwoven prebond fabric, a make resin of 49.15% resole phenolic resin, 10.19% water, 40.56% calcium carbonate filler, 0.10% EMULAN A emulsifier (BASF, Florham Park, N.J.), and a trace amount of cryolite was applied to achieve a wet add-on of 200 gms/square meter. 323 grams per square meter of the abrasive particles of Example 1 were drop coated onto the make coat. The composite was then heated to 90 degrees C. and maintained at this temperature for 90 minutes. A size coating of 50.56% DOCANOL PMA 484431 (Sigma Aldrich, St. Louis Mo.), 36.2% ADEPRINE BL-16 (Chemutra Group, Middlebury Conn.) polyurethane resin and 13.24% curative LAPDX K450 (42.33% in PMA) (Royce International, East Rutherford, Conn.) was applied by roll coating to achieve a wet-add-on of 96 grams per square meter. The resulting composite was then heated at 330 degrees C. and maintained at this temperature for 5 minutes. The resulting abrasive article is shown in FIG. 11.

Comparative Example B

Comparative Example B was prepared identically to Example 2 with the exception that the abrasive particles of Comparative Example A were substituted for the abrasive particles of Example 1.

Nonwoven Abrasive Article Testing

Nonwoven abrasive discs were cut from Example 2 and Comparative Example B and attached to 3M Blue Vinyl Foam #02345 backup pads (obtained from 3M Company of Maplewood, Minn.) and mounted on a random orbital sander. The random orbital sander was activated to operate at 3450 rpm and urged against a die steel rule (45 Rockwell) under a load of 6 lb (2.72 kg) over a 10 inch (25.4 cm) traverse at 2 ft/min (0.61 m/min).

The initial cut rate (the cut during the first traverse) of the sample from Example 2 was three times as high as that of the sample from Comparative Example B. The total cut after three cycles was about 0.09 grams of steel for the sample from Example 2 and 0.04 grams for the sample from the Comparative Example B. The sample from Example 2 was judged to have a significantly improved grinding performance compared to Comparative Example B.

What is claimed is:

1. Shaped abrasive particles comprising a ceramic and comprising a first plate integrally joined to a second plate at a predetermined angle $\beta$.

2. The shaped abrasive particles of claim 1 wherein the first plate or the second plate comprises a first major surface and a second major surface connected by at least one sidewall.

3. The shaped abrasive particles of claim 2 wherein a draft angle a between the second major surface and the at least one sidewall is between approximately 90 degrees to approximately 135 degrees.

4. The shaped abrasive particles of claim 3 wherein the draft angle α between the second major surface and the sidewall is between approximately 95 degrees to approximately 120 degrees.

5. The shaped abrasive particles of claim 1 wherein the first plate comprises a truncated triangular pyramid and the second plate comprises a truncated triangular pyramid.

6. The shaped abrasive particles of claim 1 wherein the first plate comprises a triangular prism and the second plate comprises a triangular prism.

7. The shaped abrasive particles of claim 1 wherein the first plate comprises a rhombus prism and the second plate comprises a triangular prism.

8. The shaped abrasive particles of claim 1 wherein the first plate comprises a truncated rhombus pyramid and the second plate comprises a truncated triangular pyramid.

9. The shaped abrasive particles of claim 1, 2, 3, 4, 5, 6, 7, or 8 wherein the predetermined angle $\beta$ is about 90 degrees.

10. The shaped abrasive particles of claim 1, 2, 3, 4, 5, 6, 7, or 8 wherein the predetermined angle $\beta$ is between about 20 degrees to about 85 degrees.

11. The shaped abrasive particles of claim 1, wherein the shaped abrasive particles comprise alpha alumina and are formed by molding a boehmite alumina sol gel.

12. An abrasive article comprising the shaped abrasive particles of claim 1 and a binder.

13. The abrasive article of claim 12 wherein the abrasive article is selected from the group consisting of a coated abrasive article, a nonwoven abrasive article, a bonded abrasive article, or an abrasive brush.

14. The abrasive article of claim 13 wherein the binder comprises a make coat of the coated abrasive article and the shaped abrasive particles are attached by the first plate to a backing by the make coat.

* * * * *

UNITED STATES PATENT AND TRADEMARK OFFICE
CERTIFICATE OF CORRECTION

PATENT NO. : 8,728,185 B2  
APPLICATION NO. : 13/811028  
DATED : May 20, 2014  
INVENTOR(S) : Negus Adefris Page 1 of 1

It is certified that error appears in the above-identified patent and that said Letters Patent is hereby corrected as shown below:

In the Specification

Column 8  
Line 6, delete "erodable" and insert -- erodible --, therefor.

Column 12  
Line 21, delete "hathium," and insert -- hafnium, --, therefor.

Column 13  
Line 65, delete "sterate," and insert -- stearate, --, therefor.

Column 15  
Line 35, delete "2008" and insert -- 2008. --, therefor.  
Line 49, delete "edges" and insert -- edges. --, therefor.

Column 16  
Line 11, delete "Y2O3, 4.0% La2O3" and insert -- $Y_2O_3$, 4.0% $La_2O_3$ --, therefor.  
Line 54, delete "(Chemutra" and insert -- (Chemtura --, therefor.

In the Claims

Column 17  
Line 26, in Claim 3, delete "a" and insert -- α --, therefor.  
Line 30, in Claim 4, delete "αbetween" and insert -- α between --, therefor.

Signed and Sealed this  
Thirtieth Day of September, 2014

Michelle K. Lee  
*Deputy Director of the United States Patent and Trademark Office*